UNITED STATES PATENT OFFICE.

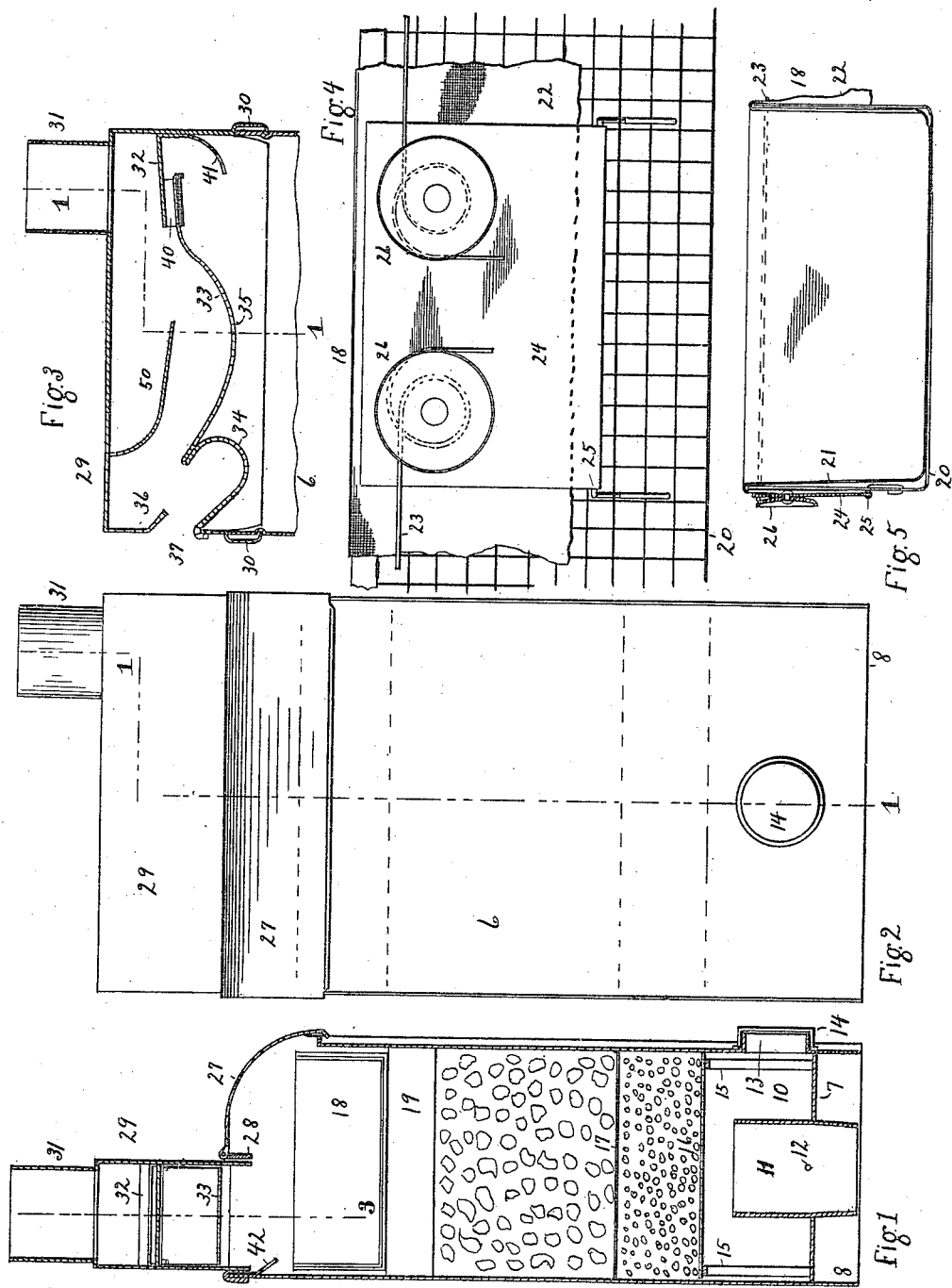

LEROY W. FRENCH, OF TOPEKA, KANSAS.

RAIN-WATER FILTER.

986,161.

Specification of Letters Patent. Patented Mar. 7, 1911.

Application filed August 13, 1909. Serial No. 512,648.

*To all whom it may concern:*

Be it known that I, LEROY W. FRENCH, a citizen of the United States, and a resident of the city of Topeka, in the county of Shawnee and State of Kansas, have invented a new and useful Improvement in Rain-Water Filters, of which the following is a specification.

My invention relates to rain-water filters constructed preferably of sheet metal and adapted to be made in a shop and attached to the spouting on a house.

It is the object of my invention to improve generally upon rain-water filters of this general nature; to simplify the same in point of construction; to make the filter so that the filtering materials and each of them may be easily changed, and so that all the interior may be easily accessible; to provide a basin in which sediment passing through the filtering substances may settle, and to provide such a settling basin which will permit all the water to flow out so that no water can remain standing in the filter and freeze; to provide a special arrangement for discharging leaves and other large foreign substances out of the filter before the water enters into the filtering chamber proper; and to provide the various arrangements, improvements, and combinations hereinafter set forth. And my invention consists of the several arrangements, improvements, and combinations hereinafter set forth and claimed.

In the drawings accompanying and forming part of this specification, and in the description of the drawing, I have shown my invention in its preferred form, and have shown what I deem to be the best mode of applying the principles thereof; but it is to be understood that the invention itself is not confined to the exact details of the drawings and of the description, and that I contemplate changes in form, proportions, and materials, the transposition of parts, and the substitution of equivalent members, without departing from the spirit of the invention.

Figure 1 is a central vertical sectional elevation of a filter made in accordance with the principles of my invention, taken on the plane indicated by the line 1 in Figs. 2 and 3. Fig. 2 is a front elevation. Fig. 3 is a sectional elevation of the inlet device, taken on the line 3 in Fig. 1. Fig. 4 is an enlarged detail of a portion of the tray with the device for securing a cloth therein by means of a cord. And Fig. 5 is a sectional view of the cloth strainer.

Similar reference characters indicate like or corresponding parts throughout the several views.

The main casing of the filter comprises the galvanized sheet metal walls 6, 6, and the bottom 7, the bottom being raised above the lower edges of the side walls the distance of the flange 8. In the lower part of the frame is formed a basin 10, and an outlet pipe 11 extends through the bottom up into the basin nearly to its top; and the pipe also extends below the bottom so that it may be inserted in the upper end of the spout leading therefrom to the cistern. The object of the raised bottom is to arrange the filter so that it can be set on the floor, as in the shop, warehouse, store, or elsewhere without danger of bending or breaking the projecting end of the spout 11. A small hole 12 may be made through the pipe at the bottom of the basin for the purpose of draining the basin; and at one side of the basin is an opening 13 through the front wall, with a water-tight screw-cap 14, giving access to the basin for cleaning and other purposes.

Just above the basin is a perforated metal plate 16, which may be supported by legs 15, 15, and on this plate in the casing is placed a quantity of gravel, on top of which may be laid the coarse wire cloth 17, and on top of this wire cloth may be placed charcoal.

18 is the cloth strainer supported on side brackets 19, and constructed preferably as follows: The wire cloth tray 20 is made rather shallow and of a size to fit within the casing, and suitable straining cloth, such as cheese cloth or bunting, is used for lining the inner sides of the tray, the tray thus forming merely a support for the cloth which does the straining. The cloth may be secured to the tray by lapping the edges 22 on the outer side of the tray and securing them with a simple cord 23. 24 is a plate hinged on the outside of the tray, as at 25, and provided with the two disks 26, 26 which are pivoted to the plate; the disks are curved outwardly so that the cord may be clamped to the plate by merely drawing the cord around the pivot between the plate and disk. The plate is arranged so that the overlapping end of the cloth may be covered by it. The cloth is applied when the plate is hanging down; the plate is then turned up against the cloth and the side of the tray; one end of the cord is secured to one disk, the cord is passed around the tray over the edges of the cloth and secured to the other disk, as indicated. This makes a very simple and cheap method of securing the cloth, and one by which the cloth may be applied and removed with the utmost convenience.

27 is a hinged door covering the upper front corner of the casing, through which the tray may be inserted into or removed from the inside of the casing, and also through which the charcoal and gravel may be put in or removed from the casing. It may be hinged to the cross-piece 28.

Removably secured to the upper end of the casing is an inlet box 29 whose purpose is to discharge the leaves and other large particles of foreign substances. This inlet box comprises a casing which is open at the bottom and provided at the top at one end with an inlet pipe 31; it may be secured to the main casing by means of the clips 30, 30 which engage in depressions 30' in the outer face of the main casing.

32 is a deflecting plate arranged just underneath the inlet pipe and inclined downwardly toward the other end of the box. From under this deflecting plate the perforated metal strainer 33 extends in a downward and upward curve 35 toward the other end of the box, and just in advance of that end it is formed into a pocket 34 and terminates on the lower edge of the opening 37. Above the long curve 35 and opposite the plate 32 is a shelf 50, and above the pocket 34 is an inwardly and downwardly extending flange 36. There is a passage 40 between the plate 32 and the plate 33, and a flange 41 under the opening. The water coming in with considerable force through the inlet pipe, with the leaves and other refuse, strikes on the plate 32, and is deflected toward the other end of the box. I find that the solid substances and some of the water pass onto the perforated plate 33, and a large proportion of the water passes onto the shelf 50. The force of the water drives the solid substances along the curved plate, a large part of the water passing through the plate. The water which has not passed through the plate is thrown over against the end of the box at 36, and the flange 36 directs it down into the pocket 34 through which, its force being spent, it passes into the filtering chamber. The leaves and other large substances which cannot pass through the perforations in the plate, accumulate in the pocket 34 and are discharged through the opening 37. Also a considerable portion of the water passes back through the passage 40 into the filtering chamber. It will be understood that the object of this inlet box is to separate the leaves, etc., from the water in the shortest possible space, and that the apparatus must be so arranged as to handle all quantities of water. And this object is accomplished by the arrangement shown.

It is a feature of my inlet-box that it is removable and reversible so that the filter may be applied to any house and to either corner, which greatly simplifies the making and installing of the filter.

A flange 42 may be provided above the cloth strainer to deflect the water away from the outer edge.

The water on passing through the inlet box passes through the strainer cloth, thence through the bed of charcoal, thence through the bed of gravel, and thence into the settling basin. In the settling basin the heavy substances which may have passed thereinto will lodge on the bottom of the basin, the water flowing only from the surface into the outlet pipe. But the minute opening 12 will permit the water to flow out of the basin so that none can remain therein long enough to freeze or become stagnant, though this opening is not large enough to permit the passage of such a quantity of water as would pass through the filter even during a light rain. The basin may be cleaned through the opening 13. The tray 18 may be removed from time to time and a fresh cloth applied, by the very simple operation hereinbefore explained, and the charcoal and gravel may also be changed whenever desirable with little effort.

What I claim is:

1. In a filter, the combination of an openwork metal tray, a plate loosely secured thereto on the outside, a cloth lining the inside of the tray and overlapping the outer sides, said plate being adapted to overlap said cloth, a cord surrounding the sides of the tray to hold the cloth thereon, and a means for fastening the cord to the plate.

2. In a filter, the combination of an openwork metal tray, a plate hinged to the outside thereof, a cloth lining the inside of the tray and extending over the upper edge and down on the outer side thereof, a rounded disk pivoted to the plate, and a cord surrounding the tray for securing the cloth thereto and having its end clamped between the plate and the disk, said plate being adapted to overlap the downwardly extending part of the cloth.

3. In a filter, the combination with a casing having a filtering chamber therein, of an inlet-box secured thereto and located above the filtering chamber and provided with a perforated metal bottom and an outlet through one end thereof and an inlet through the top at the other end, said inlet box being detachably secured to the casing and capable of being set with said openings in each of two directions.

4. In a filter, the combination with a casing having a filtering chamber therein, of an inlet-box on top of the casing with an inlet pipe leading thereinto at one side, a deflecting plate 32 under said pipe, a shelf 50 opposite said plate 32, a curved perforated plate 35 extending from said plate 32 under said shelf 50, a pocket 34 with a perforated bottom, a deflector 36 above said pocket, and said inlet-box being provided with an opening 37, all substantially as set forth.

5. The combination with a casing having a settling chamber in the bottom thereof and an outlet therefrom and a closure in the wall, a filtering chamber above said settling basis with filtering material therein, a removable tray with filtering cloth therein above the filtering chamber, said casing having a door adjacent the tray, and an inlet-box above the tray having an inlet pipe, a lateral opening, and a perforated metal bottom; all substantially as set forth.

6. The combination with a casing having a basin in the bottom thereof and an outlet from said basin through the bottom thereof and an opening with a closure in the wall of said basin, a filtering chamber above said basin with filtering material therein, of a removable tray with filtering cloth therein above the filtering chamber, said casing having a door adjacent the tray, and a reversible inlet box above the tray having an inlet pipe, a lateral opening, and a perforate metal bottom.

7. The combination of a casing having a basin in the bottom thereof and an outlet therefrom with an opening in the wall of said basin to give access thereto and a closure for said opening, brackets for supporting a perforated metal plate above said basin, said plate removably supported on said brackets, filtering material in said casing supported on said plate, brackets for supporting a cloth-lined tray above said filtering material, said cloth-lined tray removably supported on said last-named brackets, and said casing being provided with an inlet at the top to guide the water into said tray, and being also provided with a door adjacent said tray through which the tray may be inserted into and removed from its brackets.

In testimony whereof I have hereunto set my hand in the presence of subscribing witnesses.

LEROY W. FRENCH.

Witnesses:
J. M. STARK,
C. J. ROSEN.

---

Copies of this patent may be obtained for five cents each, by addressing the "Commissioner of Patents, Washington, D. C."